United States Patent
Xie

(10) Patent No.: US 10,457,865 B2
(45) Date of Patent: Oct. 29, 2019

(54) WATER-SOLUBLE QUANTUM DOT (QD) AND MANUFACTURING METHODS OF THE WATER-SOLUBLE QD AND THE QD FILMS

(71) Applicant: Shenzhen China Star Optoelectronics Technology Co., Ltd., Shenzhen, Guangdong (CN)

(72) Inventor: Huafei Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 206 days.

(21) Appl. No.: 15/119,375

(22) PCT Filed: Aug. 3, 2016

(86) PCT No.: PCT/CN2016/093021
§ 371 (c)(1),
(2) Date: Aug. 16, 2016

(87) PCT Pub. No.: WO2017/215093
PCT Pub. Date: Dec. 21, 2017

(65) Prior Publication Data
US 2018/0171219 A1 Jun. 21, 2018

(51) Int. Cl.
*C09K 11/07* (2006.01)
*C08G 73/02* (2006.01)
(Continued)

(52) U.S. Cl.
CPC .............. *C09K 11/07* (2013.01); *C08G 73/02* (2013.01); *C08G 73/0206* (2013.01);
(Continued)

(58) Field of Classification Search
CPC .................................................. Y10S 438/962
See application file for complete search history.

(56) References Cited

U.S. PATENT DOCUMENTS

2012/0241646 A1  9/2012  Zhong et al.

FOREIGN PATENT DOCUMENTS

| CN | 1624069 A | 6/2005 |
| CN | 101003728 A | 7/2007 |

(Continued)

OTHER PUBLICATIONS

Polyelectrolyte-Quantum Dot Multilayer Films Fabricated by Combined Layer-by-Layer Assembly and Langmuir-Schaefer Deposition Langmuir, 2004, 20 (6), pp. 2057-2059 DOI: 10.1021/la035863v.

(Continued)

*Primary Examiner* — Peter F Godenschwager
(74) *Attorney, Agent, or Firm* — Andrew C. Cheng

(57) ABSTRACT

The present disclosure relates to a water-soluble QD, and manufacturing methods of the water-soluble QDs and the QD films. The manufacturing method includes respectively providing oil-soluble QDs and multi-mercapto polymers, mixing the multi-mercapto polymer and the oil-soluble QDs such that the multi-mercapto polymer and the oil-soluble QDs are reacted with each other to conduct ligand exchange under protection of inert gas, and adding appropriate volume of water and collecting aqueous solution on a top layer after reaction to obtain water-soluble QDs. By adopting the above method, stable water-soluble QDs may be obtained, and the optical performance of the QDs may be maintained. In addition, the water-soluble QDs carrying the electrical charges may be adopted to prepare the QD film via the LBL method.

5 Claims, 3 Drawing Sheets

(51) Int. Cl.
*C08G 75/08* (2006.01)
*C08L 25/06* (2006.01)
*C09K 11/02* (2006.01)
*B82Y 20/00* (2011.01)
*B82Y 30/00* (2011.01)

(52) U.S. Cl.
CPC .............. *C08G 75/08* (2013.01); *C08L 25/06* (2013.01); *C09K 11/02* (2013.01); *B82Y 20/00* (2013.01); *B82Y 30/00* (2013.01); *C09K 2219/03* (2013.01)

(56) References Cited

FOREIGN PATENT DOCUMENTS

| CN | 101012373 A | 8/2007 |
|---|---|---|
| CN | 103074051 A | 5/2013 |
| CN | 103203022 A | 7/2013 |
| CN | 103030784 A | 10/2014 |
| CN | 103772872 A | 6/2016 |
| WO | 2010/051325 A1 | 5/2010 |

OTHER PUBLICATIONS

"Yuwen, Li-Hui et al., Synthesis of High Quality CdTe Quantum Dots in Aqueous Solution Using Multidentate Polymer Ligands under Microwave Irradiation, Acta Physico-Chimica Sinica, Mar. 13, 2014, p. 994-1000, vol. 30".

Kotov, Nicholas A. et al.,Layer-by-Layer Self-Assembly of Polyelectrolyte-Semiconductor Nanoparticle Composite Films, J. Phys. Chem., Aug. 1, 1999, p. 13065-13069, vol. 99.

Hong, H. et al., Possible evidence for quantum-size effects in self-assembled ultrathin films containing conjugated copolymers, J. Appl. Phys., Mar. 15, 1996, p. 3082-3088, vol. 79 No. 6.

Decher, G. et al., Buildup of ultrathin multilayer films by a self-assembly process: III. Consecutively alternating adsorption of anionic and cationic polyelectrolytes on charged surfaces, Thin Solid Films, Apr. 30, 1992, p. 831-835, vols. 210-211 Part 2.

polymers having the amino (P-NH$_2$)    polymers having the mercapto (P-SH)

WATER-SOLUBLE QUANTUM DOT (QD) AND MANUFACTURING METHODS OF THE WATER-SOLUBLE QD AND THE QD FILMS

BACKGROUND OF THE INVENTION

1. Field of the Invention

The present disclosure relates to quantum dot (QD) technology, and more particularly to a water-soluble QD, and manufacturing methods of the water-soluble QDs and the QD films.

2. Discussion of the Related Art

QDs is a quasi-zero-dimensional crystal particles formed by a limited number of atoms, which can emit fluorescence when excited by short-wavelength light. QDs are characterized by attributes, such as wide color gamut, high color saturation, large Sri Lanka Stokes shift, anti-photobleaching, and so on. In addition, the entire visible spectrum from blue to near-infrared light may be achieved by controlling the particle size, composition and structural elements, etc. Therefore, the QDs may be adopted by the photosensitive cells, liquid crystal display and medical imaging.

QDs chemical preparation methods can be roughly divided into organic and aqueous phase synthesis method based on different solvents. The aqueous phase synthesis method is characterized by attributes, such as mild reaction conditions, simple to operate, easy to introduce functional groups and other functional advantages, but only a few low quantum yield QDs can be prepared. In addition, optical stability is poor, and the reaction takes a long time. The organic phase synthesis method has defect, such as harsh reaction conditions, also, the prepared QDs can only be dissolved out in an organic solvent, which is not conducive to the subsequent modifications and applications. However, the organic phase synthesis method is a controlled manufacturing process. The QDs of different particle sizes may be prepared by controlling the reaction time. In addition, the prepared QDs are characterized by high quantum yield, optical stabilization, and good mono-dispersion, which cannot be realized by the aqueous phase synthesis method. Thus, the organic phase synthesis method is generally adopted to obtain high-quality QDs.

The QDs are fixed or dispersed on the nanometer film via assembly methods, such as layer-by-layer (LBL). The LBL method is characterized by attributes, such as, simple, no special equipment is required, no restriction with respect to the shape and size of the carrier, and the thickness may range from a few nanometers to several hundred nanometers, and thus the LBL method has got more and more attention. However, the LBL deposition mode intents to reduce environmental pollution and to reduce costs, often come along with aqueous solution, therefore, the oil-soluble QDs become a major obstacle with regard to the LBL method.

There are two conventional ways to convert the oil-soluble QDs into water-soluble QDs, including wrapping the oil-soluble QDs with amphiphilic polymer and applying ligand exchange or ligand modification toward the oil-soluble QDs. With respect to the first way, the optical properties of QDs may be better kept, but defects such as large volume aggregation prone and settlement, after the QDs are wrapped, may exist. With respect to the second way, due to the catalyst, the QDs quenching effect may occur. Currently, the QDs may be water-soluble by utilizing a water-soluble small molecule compounds for the oil-soluble QDs to conduct ligand exchange. However, due to the limited number of individual small molecule ligand functional group, the small molecule ligands may easily fall off from the surface of QDs after a period of time, which may cause QDs agglomeration and precipitation.

SUMMARY

The present disclosure relates to water-soluble QDs, and manufacturing methods of the water-soluble QDs and the QD films to obtain stable water-soluble QDs. At the same time, the optical performance of the QDs may be maintained, which contributes to the thin film manufacturing.

In one aspect, a water-soluble quantum dots (QDs) includes: ligands bonded with a rim of the QD of the water-soluble QD is a water-soluble multi-mercapto polymer, the multi-mercapto polymer is bonded in the rim of the QD by a plurality of mercapto on the multi-mercapto polymer to form the water-soluble QD.

In another aspect, a manufacturing method of water-soluble quantum dots (QDs) includes: respectively providing oil-soluble QDs and multi-mercapto polymers; mixing the multi-mercapto polymer and the oil-soluble QDs such that the multi-mercapto polymer and the oil-soluble QDs are reacted with each other to conduct ligand exchange under protection of inert gas; adding appropriate volume of water and collecting aqueous solution on a top layer after reaction to obtain water-soluble QDs.

Wherein the step of providing the multi-mercapto polymer further includes: dissolving the polymers containing alkanes and episulfide alkanes in dry chloroform, and after the reaction under a first predetermined condition, obtaining the multi-mercapto polymer.

wherein under the protection of the inert gas, dripping slowly the multi-mercapto polymers into the oil-soluble QDs, after a first predetermined time under a first temperature, adding the appropriate volume of the water and increasing the temperature of the water to a second temperature, and the reaction is conducted for a second predetermined time.

Wherein the step of collecting the aqueous solution on the top layer after the reaction to obtain the water-soluble further includes adding a small amount of dithiothreitol (DTT) after the temperature is reduced, and extracting and collecting the aqueous solution on the top layer to obtain the water-soluble QDs.

Wherein the episulfide alkanes is ethylene sulfide.

Wherein the first predetermined condition is defined as under 60 degrees Celsius and a magnetic stirring reaction is conducted for 10 hours.

Wherein the polymers containing amino is at least one of the chitosan, poly dopamine, polyethyleneimine, and polylysine.

Wherein the first temperature is 50 degrees Celsius, the first predetermined time is 2 hours, the second temperature is 90 degrees Celsius, and the second predetermined time is 2 hours.

In another aspect, a manufacturing method of quantum dot (QD) film includes: coating an organic polymer film on a substrate, and the organic polymer film carries electrical charges; forming a second QD film on the organic polymer film on the substrate by the water-soluble QDs of claim 6, wherein the water-soluble QDs carry the electrical charges opposite to the electrical charges of the organic polymer film; respectively arranging a plurality of layers of the organic polymer films and QD films on the second QD film to form a multi-layer and controllable compound film.

Wherein the organic polymer film is a polystyrene sulfonate film carrying negative electrical charges, and the water-soluble QDs carry positive electrical charges.

Wherein the step of forming the second QD film on the organic polymer film on the substrate by the water-soluble QDs further includes: arranging a surface of the substrate carrying positive charges within poly (sodium-p-styrenesulfonate) solution for 20 minutes, cleaning the substrate by ultrapure water and drying the substrate by nitrogen gas such that the substrate is covered by the organic polymer film carrying negative electrical charges; and immersing the substrate into prepared water-soluble QD solution for 20 minutes, cleaning the the substrate by the ultrapure water and drying the substrate by the nitrogen gas such that the substrate is respectively covered by the organic polymer film carrying negative electrical charges and is covered by the second organic polymer film carrying the positive electrical charges.

In view of the above, as the mercapto and the metal atoms may be easily bonded, the multi-mercapto polymer may be stably bonded with the QD, which prevents the multi-mercapto polymer from being detached. The hydrophilic multi-mercapto polymer may stably attach to the rim of the QD, such that the oil soluble QDs may be converted into the water-soluble. In this way, the stable water-soluble may be obtained, and the optical performance of the QD may also be maintained.

DETAILED DESCRIPTION OF THE EMBODIMENTS

Embodiments of the invention will now be described more fully hereinafter with reference to the accompanying drawings, in which embodiments of the invention are shown.

Figure 1:
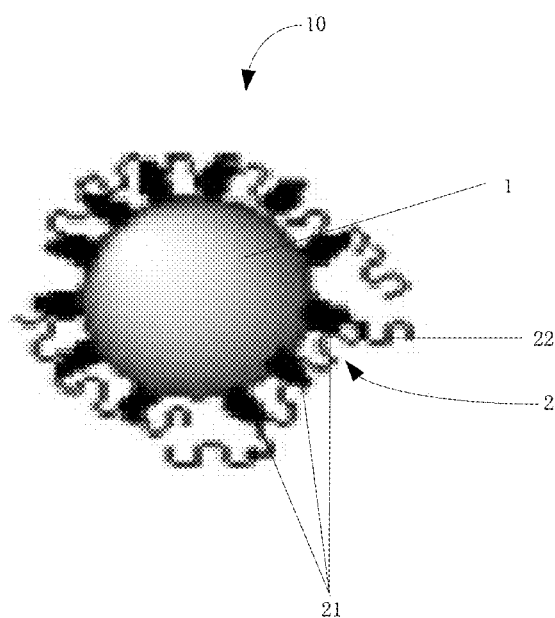
FIG. 1 is a schematic view of the water-soluble QDs in accordance with one embodiment.

Referring to FIG. 1, ligands bonded with a rim of the QD 1 of the water-soluble QD 10 is a water-soluble multi-mercapto polymer 2, which is bonded in the rim of the QD 1 by a plurality of mercapto on the multi-mercapto polymer 2 to form the water-soluble QD 10. The multi-mercapto polymer 2 includes a plurality of mercapto 21 and a plurality of polymers 22. Generally, the multi-mercapto polymer 2 may be formed by the polymer and the compound with mercapto. The ligands bonded with the rim of the QD 1 may be a plurality of water-soluble multi-mercapto polymer 2. In FIG. 1, three water-soluble multi-mercapto polymers 2 are bonded in the rim of the QD 1.

The oil-soluble QDs may be, but not limited to, the QDs of shell structures, such as CdSe/ZnS, CdTd/CdSe, and CdSe/CdS/ZnS emitting wavelength including 525, 565, and 650 nm.

The polymers 22, before reacted with the mercapto, may include, but not limited to, at least one of chitosan, poly dopamine, polyethyleneimine, and polylysine. The polymers include good adhesiveness and film forming ability. In addition, the polymers are water-soluble polymer carrying positive electricity, which contributes to the formation of the QD films via the LBL assembly method.

As the mercapto and the metal atoms may be easily bonded, the multi-mercapto polymer may be stably bonded with the QD, which prevents the multi-mercapto polymer from being detached. The hydrophilic multi-mercapto polymer may stably attach to the rim of the QD, such that the oil soluble QDs may be converted into the water-soluble. In this way, the stable water-soluble may be obtained, and the optical performance of the QD may also be maintained.

Figure 2:
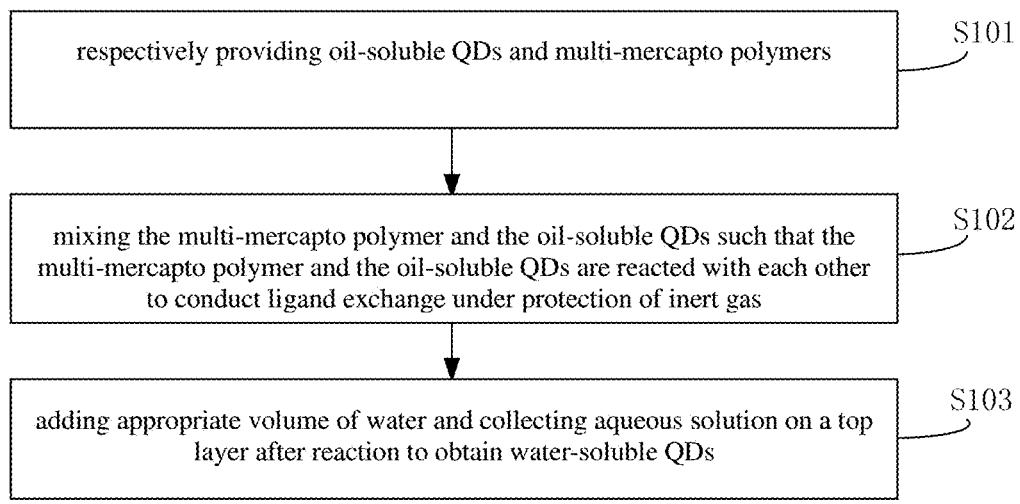
FIG. 2 is a flowchart illustrating the manufacturing method of the water-soluble QDs in accordance with one embodiment.

FIG. 2 is a flowchart illustrating the manufacturing method of the water-soluble QDs in accordance with one embodiment. The method includes the following steps.

In step S101, respectively providing the oil-soluble QDs and multi-mercapto polymers.

The organic phase synthesis method for preparing the oil-soluble QDs is a controllable manufacturing process, wherein the QDs having different particle sizes may be prepared by controlling the reaction time. In addition, such method includes advantages such as the quantum yield of the QDs is high, optical stability, and mono-dispersion, and such advantages are excluded from the QDs prepared by the aqueous phase synthesis method. Further, the oil-soluble QDs may be prepared by conventional technology.

The multi-mercapto polymer may include a plurality of mercapto and a plurality of polymers. The multi-mercapto polymer may be prepared by the reaction between the polymers and the mercapto compound, polyvalent mercaptan, and sulfide alkanes.

In step S102, under protection of inert gas, the multi-mercapto polymer and the oil-soluble QDs are mixed and are reacted with each other so as to conduct ligand exchange.

The inert gas is configured for avoiding the reaction between the multi-mercapto polymers. The purpose of this step is to replace the hydrophobic ligands bonded in the rim of the oil-soluble QDs by the multi-mercapto polymers. Thus, it is needed to avoid the reaction between the multi-mercapto polymers. The inert gas may be nitrogen or argon.

The mercapto may be easily bonded with the metal atom. Under the protection of the inert gas, it is of low possibility that the multi-mercapto polymers may reacts with each other. As such, the multi-mercapto polymers shift to bond with the hydrophobic ligands in the rim of the oil-soluble QDs such that the mercapto replaces the hydrophobic ligands to wrap the QDs. As the multi-mercapto polymer is hydrophilic, the oil-soluble QDs are converted to be the water-soluble, and the optical performance of the QDs remains the same.

In step S103, adding appropriate volume of water and collecting aqueous solution on a top layer after reaction to obtain water-soluble QDs.

The oil-soluble QDs may only resolve within the organic solution. Thus, the multi-mercapto polymer 2 and the oil-soluble QDs are mixed during the organic phase. When the reaction is completed, adding the appropriate volume of water in accordance with real scenario. As the multi-mercapto polymer is water-soluble, when the multi-mercapto polymers wrap the QDs, the wrapped QDs are also water-soluble. The QDs wrapped by the multi-mercapto polymers are then transferred to the water, and the aqueous solution on the top layer is collected to obtain the water-soluble QDs.

In view of the above, the oil-soluble QDs and the multi-mercapto polymers are respectively provided. Under the protection of inert gas, the multi-mercapto polymer and the oil-soluble QDs are mixed and the reaction therebetween results in a ligand exchange. Appropriate volume of water is added and the aqueous solution on a top layer is collected after an reaction to obtain the water-soluble QDs. As the mercapto and the metal atoms may be easily bonded, the multi-mercapto polymer may be stably bonded with the QD, which prevents the multi-mercapto polymer from being detached. The hydrophilic multi-mercapto polymer may stably attach to the rim of the QD, such that the oil soluble QDs may be converted into the water-soluble. In this way, the stable water-soluble may be obtained, and the optical performance of the QD may also be maintained.

In step S101, the step of providing the multi-mercapto polymer 2 includes the following steps.

The polymers containing alkanes and episulfide alkanes are dissolved in dry chloroform, and after the reaction under a first predetermined condition, the multi-mercapto polymer may be obtained.

First, a ring-opening process is applied to the episulfide alkanes to form mercapto alkane. The mercapto alkane reacts with the polymer having amino, and the mercapto replaces a plurality of aminos of the polymers to form the multi-mercapto polymers.

Figure 3:
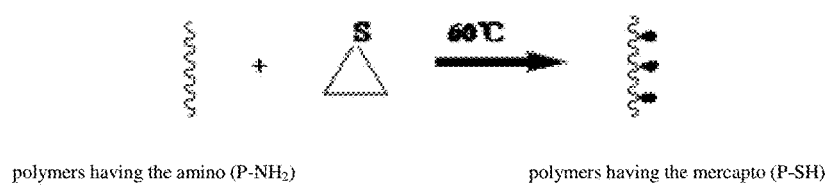
FIG. 3 is a specific reaction flowchart with respect to the manufacturing method of the water-soluble QDs in accordance with one embodiment.

Specifically, the episulfide alkanes relates to ethylene sulfide. When the first predetermined condition is defined as under 60 degrees Celsius plus the magnetic stirring reaction for 10 hours. That is, as shown in FIG. 3, the polymers having the amino (referred to as P-NH2) and the ethylene sulfide are dissolved within the dry chloroform, after the magnetic stirring reaction lasts for 10 hours, the amino is adopted to apply the ring-opening process toward the ethylene sulfide to form the multi-mercapto polymer (referred to as P—SH).

Wherein the polymers having the amino may be at least one of the Chitosan, poly dopamine, polyethyleneimine, and polylysine. The polymers include good adhesiveness and film forming ability. In addition, the polymers are water-soluble polymer carrying positive electricity, which contributes to the formation of the QD films via the LBL assembly method.

The oil-soluble QDs may be, but not limited to, the QDs of shell structures, such as CdSe/ZnS, CdTd/CdSe, and CdSe/CdS/ZnS emitting wavelength including 525, 565, and 650 nm.

In step S102, under the protection of inert gas, the multi-mercapto polymers are dripped slowly to the oil-soluble QDs. After a first predetermined time under a first temperature, the appropriate volume of water are added and the temperature of the water is increased to a second temperature. Afterward, the reaction is conducted for a second predetermined time.

When the multi-mercapto polymers are dripped slowly to the oil-soluble QDs to conduct the reaction, the specific conditions may be configured in accordance with real scenario. It can be understood that the reaction conditions may be different within different reaction systems.

In step S103, reducing a temperature, adding a small amount of dithiothreitol, extracting and collecting the aqueous solution on the top layer to obtain the water-soluble QDs.

The dithiothreitol operates as reducing agents to prevent the un-bonded ligands drifting above the multi-mercapto polymer of each of the water-soluble from reacting with each other. As such, each of the water-soluble may be independently dispersed, instead of being aggregated together. That is, the dispersity of the water-soluble QDs may be enhanced. In other scenarios, other reducing agents may be adopted.

Specifically, the first temperature is 50 degrees Celsius, the first predetermined time is 2 hours, the second temperature is 90 degrees Celsius, and the second predetermined time is 2 hours.

Figure 4:
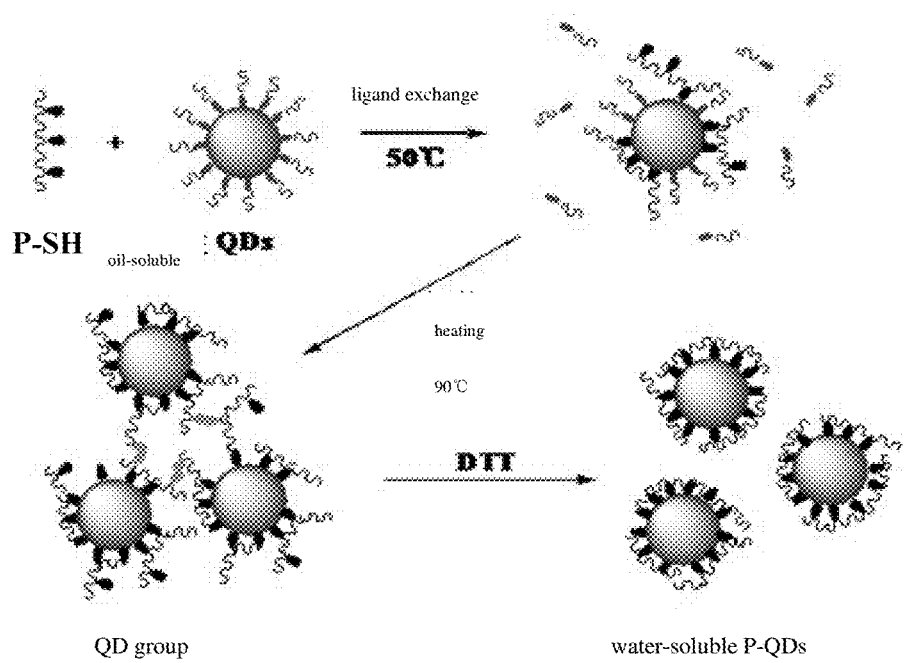
FIG. 4 is another specific reaction flowchart with respect to the manufacturing method of the water-soluble QDs in accordance with one embodiment.

As shown in FIG. 4, under the protection of the inert gas, the P—SH are dripped slowly to the oil-soluble QDs resolved within the chloroform. In an example, the oil-soluble QDs may be of shell structures, such as CdSe/ZnS, CdTd/CdSe, and CdSe/CdS/ZnS emitting wavelength including 525, 565, and 650 nm.

When the P—SH are dripped, the stirring process is conducted under the condition that the temperature is 50 degrees Celsius. After 2 hours, the appropriate volume of water is added and the temperature is increased to be 90 degrees Celsius, and the stirring process is conducted for 2 hours. After the temperature is reduced, a small amount of dithiothreitol (DTT) is added, and the aqueous solution on the top layer is extracted and collected to obtain the water-soluble QDs.

Figure 5:
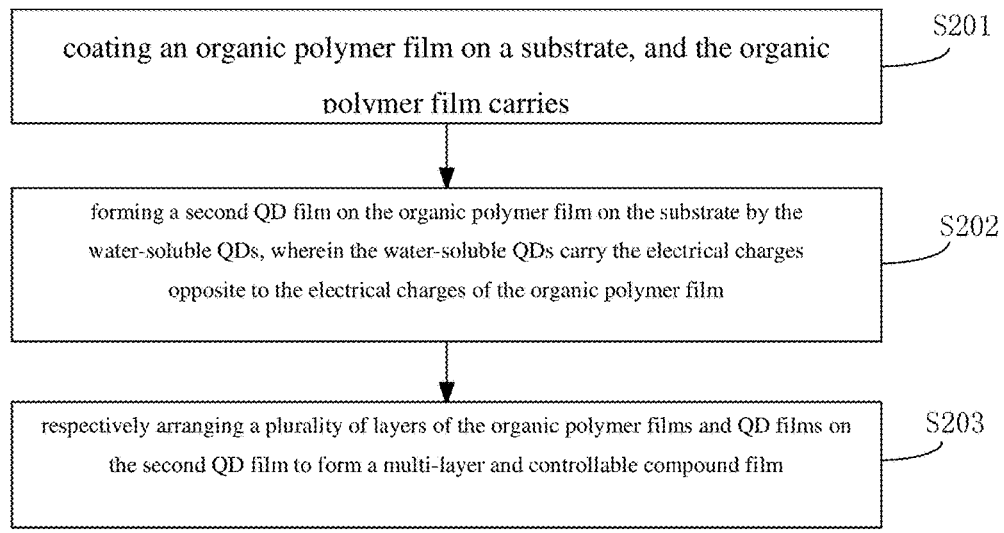
FIG. 5 is a flowchart illustrating the manufacturing method of the water-soluble QDs in accordance with one embodiment.

FIG. 5 is a flowchart illustrating the manufacturing method of the water-soluble QDs in accordance with one embodiment. As special equipment may be excluded from the LBL method, and the LBL method may be accomplished during normal temperature and normal pressure. In addition, the thickness of the film may be controlled, and there is no environmental pollution as the process is conducted within the aqueous solution. Thus, the manufacturing method adopts the LBL method, and the manufacturing method includes the following steps.

In step S201, coating an organic polymer film on a substrate, and the organic polymer film carries electrical charges.

In step S202, forming a second QD film on the organic polymer film on the substrate by water-soluble QDs, wherein the water-soluble QDs carry the electrical charges opposite to that of the organic polymer film.

With respect to the LBL principle, the assembly is conducted by the static electricity between layers. That is, the electrical charges carried by two adjacent layers are opposite to each other, such that the layers may be assembled. Thus, in this step, when the water-soluble QDs are configured to carry the electrical charges opposite to that of the organic polymer film. The water-soluble QDs carry no electrical charges or carry the electrical charges the same with that of the water-soluble QDs are not suitable.

In step S203, respectively arranging a plurality of layers of the organic polymer films and QD films on the second QD film to form a multi-layer and controllable compound film.

The QD film may be configured with demanded layers and demanded thickness by configuring the number of assembly processes.

In view of the above, an organic polymer film is coated on a substrate, and the organic polymer film carries electrical charges.

A second QD film is formed on the organic polymer film on the substrate by water-soluble QDs, wherein the water-soluble QDs carry the electrical charges opposite to that of the organic polymer film. A plurality of layers of the organic polymer films and QD films are respectively arranged on the second QD film to form a multi-layer and controllable compound film. As the water-soluble QDs carrying the electrical charges opposite to that of the organic polymer films, the water-soluble QDs may well dissolved within the water, and the optical performance may be maintained. As special equipment may be excluded from the LBL method, and the LBL method may be accomplished during normal temperature and normal pressure. In addition, the thickness of the film may be controlled, and there is no environmental pollution as the process is conducted within the aqueous solution.

Wherein the organic polymer film may be the polystyrene sulfonate film carrying negative electrical charges, and the water-soluble QDs carry positive electrical charges.

Figure 6:
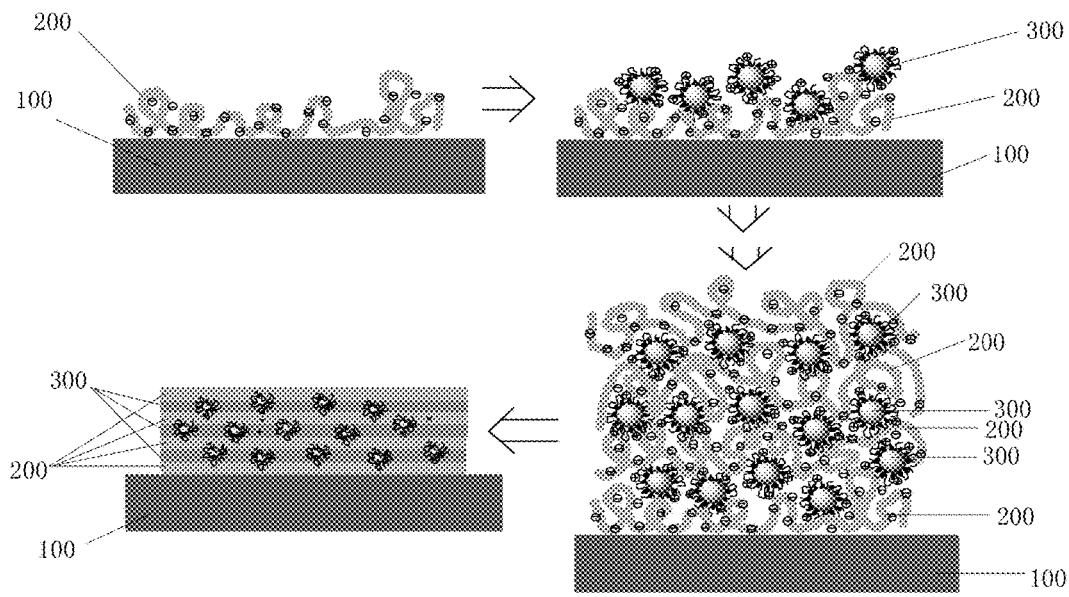
FIG. 6 is a specific reaction flowchart with respect to the manufacturing method of the water-soluble QDs in accordance with one embodiment.

As shown in FIG. 6, in one embodiment, a surface of the substrate carrying positive charges is arranged within Poly (sodium-p-styrenesulfonate) solution, which is referred to as PSS solution, for 20 minutes. Afterward, the substrate is cleaned by ultrapure water and is dried by nitrogen gas such that the substrate 100 is covered by the organic polymer film 200 carrying negative electrical charges. The substrate 100 is immersed into the prepared water-soluble QD solution for 20 minutes, and is dried by nitrogen such that the substrate 100 is covered by the first organic polymer film 200 carrying the negative electrical charges and is covered by the second organic polymer film 300 carrying the positive electrical charges. Repeatedly, the PSS/P-QDs/PSS QD compound film may be obtained, and the number of the layers and the thickness of the QD film may be obtained by configuring the number of assembly processes.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A manufacturing method of water-soluble quantum dots (QDs), comprising:
    respectively providing oil-soluble QDs and multi-mercapto polymers;
    mixing the multi-mercapto polymer and the oil-soluble QDs such that the multi-mercapto polymer and the oil-soluble QDs are reacted with each other to conduct ligand exchange under protection of inert gas;
    adding water and collecting aqueous solution on a top layer after reaction to obtain water-soluble QDs;
    the step of providing the multi-mercapto polymer further comprises:
    dissolving polymers containing amino and episulfide alkanes in dry chloroform, and after reaction under a first predetermined condition, obtaining the multi-mercapto polymer;
    wherein the step of mixing the multi-mercapto polymer and the oil-soluble QDs further comprises:
    under the protection of the inert gas, dripping the multi-mercapto polymers into the oil-soluble QDs, after a first predetermined time under a first temperature, adding the water and increasing the temperature of the water to a second temperature, and the reaction is conducted for a second predetermined time;
    the step of collecting the aqueous solution on the top layer after the reaction to obtain the water-soluble further comprises:
    adding dithiothreitol (DTT) after the temperature is reduced, and extracting
    and collecting the aqueous solution on the top layer to obtain the water-soluble QDs.

2. The method as claimed in claim 1, wherein the episulfide alkanes is ethylene sulfide.

3. The method as claimed in claim 2, wherein the first predetermined condition is defined as under 60 degrees Celsius and a magnetic stirring reaction is conducted for 10 hours.

4. The method as claimed in claim 1, wherein the polymers containing amino is at least one of the chitosan, poly dopamine, polyethyleneimine, and polylysine.

5. The method as claimed in claim 1, wherein the first temperature is 50 degrees Celsius, the first predetermined time is 2 hours, the second temperature is 90 degrees Celsius, and the second predetermined time is 2 hours.

* * * * *